United States Patent [19]
Harmon et al.

[11] Patent Number: 5,563,994
[45] Date of Patent: Oct. 8, 1996

[54] SYSTEM FOR GRAPHICALLY GENERATING THE SEQUENCE AND TEMPORAL RELATIONSHIP BETWEEN TASKS IN A PROJECT

[76] Inventors: Samuel T. Harmon; M. Tracey Harmon, both of 3525 Dandridge, Dayton, Ohio 45407

[21] Appl. No.: 208,675

[22] Filed: Mar. 11, 1994

[51] Int. Cl.$^6$ ............................................. G06T 11/00
[52] U.S. Cl. ........................................... 395/140; 395/155
[58] Field of Search ........................... 395/140, 155–161, 395/600, 650; 364/400–408

[56] References Cited

U.S. PATENT DOCUMENTS

| | | | |
|---|---|---|---|
| 3,124,885 | 3/1964 | Mendell | 35/24 |
| 3,380,177 | 4/1968 | Wagner | 35/24 |
| 3,403,458 | 10/1968 | Mendall | 35/24 |
| 3,488,863 | 1/1970 | Mendall | 35/24 |
| 3,522,666 | 8/1970 | Sarthou | 35/24 |
| 3,735,109 | 5/1973 | Berthelemy et al. | 235/185 |
| 4,019,027 | 4/1977 | Kelley | 235/89 R |
| 4,970,664 | 11/1990 | Kaiser et al. | 364/521 |
| 5,101,340 | 3/1992 | Nonaka et al. | 395/650 |
| 5,109,337 | 8/1992 | Ferriter et al. | 364/401 |
| 5,197,001 | 3/1993 | Mukherjee | 364/403 |
| 5,237,514 | 8/1993 | Curtin | 364/490 |
| 5,381,332 | 1/1995 | Wood | 364/401 |

OTHER PUBLICATIONS

"Project Managers: Upping the Organization" By Steve Gilliland, *PC Sources*, Dec. 1992, pp. 435–473.

"A Survey of New Products and Significant Upgrades" Harvey A. Levine, *PM Network*, Jul. 1993, pp. 26–30.

*Primary Examiner*—Almis R. Jankus
*Attorney, Agent, or Firm*—Gifford, Krass, Groh, Sprinkle, Patmore, Anderson & Citkowski, P.C.

[57] ABSTRACT

A computer based system for generating graphic charts and textual representations identifying the temporal and sequential relationship between a plurality of tasks which must be performed to complete a project. The system initially receives as input, from the user, a listing of the tasks and their durations. The system then generates and outputs to the user a series of inquiries each relating to the sequential order of at least two of the tasks. By selection of the tasks forming the basis for each inquiry and a logical analysis of the user's responses to previous inquiries, the system logically deduces the sequential order between all of the tasks with a minimum number of inquiries. Using the task list and duration and the sequence order derived from the responses to the inquiries the system then graphically displaying the tasks and their sequence produces any of a variety of charts, including a PERT chart, and other alphanumeric listings useful in planning and accomplishing the project.

4 Claims, 5 Drawing Sheets

FIG - 3

PATH MATRIX

SURVEY PROJECT

|    |                     | 1 | 2 | 3 | 4 | 5 | 6 | 7 | 8 | 9 | 10 |
|----|---------------------|---|---|---|---|---|---|---|---|---|----|
| 1. | START               | 0 | 1 | 1 | 1 | 1 | 1 | 1 | 1 | 1 | 1  |
| 2. | PLAN SURVEY         | 0 | 0 | 1 | 1 | 1 | 1 | 1 | 1 | 1 | 1  |
| 3. | HIRE INTERVIEWERS   | 0 | 0 | 0 | 0 | 0 | 1 | 1 | 0 | 1 | 1  |
| 4. | DESIGN QUESTIONNAIRE| 0 | 0 | 0 | 0 | 1 | 1 | 1 | 1 | 1 | 1  |
| 5. | SELECT HOUSEHOLDS   | 0 | 0 | 0 | 0 | 0 | 1 | 1 | 0 | 0 | 1  |
| 6. | CONDUCT SURVEY      | 0 | 0 | 0 | 0 | 0 | 0 | 1 | 0 | 0 | 1  |
| 7. | ANALYZE RESULTS     | 0 | 0 | 0 | 0 | 0 | 0 | 0 | 0 | 0 | 1  |
| 8. | PRINT QUESTIONNAIRE | 0 | 0 | 0 | 0 | 0 | 1 | 1 | 0 | 0 | 1  |
| 9. | TRAIN INTERVIEWERS  | 0 | 0 | 0 | 0 | 0 | 1 | 1 | 0 | 0 | 1  |
| 10.| FINISH              | 0 | 0 | 0 | 0 | 0 | 0 | 0 | 0 | 0 | 0  |

FIG - 4

ADJACENCY MATRIX

SURVEY PROJECT

|    |                     | 1 | 2 | 3 | 4 | 5 | 6 | 7 | 8 | 9 | 10 |
|----|---------------------|---|---|---|---|---|---|---|---|---|----|
| 1. | START               | 0 | 1 | 0 | 0 | 0 | 0 | 0 | 0 | 0 | 0  |
| 2. | PLAN SURVEY         | 0 | 0 | 1 | 1 | 0 | 0 | 0 | 0 | 0 | 0  |
| 3. | HIRE INTERVIEWERS   | 0 | 0 | 0 | 0 | 0 | 0 | 0 | 0 | 1 | 0  |
| 4. | DESIGN QUESTIONNAIRE| 0 | 0 | 0 | 0 | 1 | 0 | 0 | 1 | 1 | 0  |
| 5. | SELECT HOUSEHOLDS   | 0 | 0 | 0 | 0 | 0 | 1 | 0 | 0 | 0 | 0  |
| 6. | CONDUCT SURVEY      | 0 | 0 | 0 | 0 | 0 | 0 | 1 | 0 | 0 | 0  |
| 7. | ANALYZE RESULTS     | 0 | 0 | 0 | 0 | 0 | 0 | 0 | 0 | 0 | 1  |
| 8. | PRINT QUESTIONNAIRE | 0 | 0 | 0 | 0 | 0 | 1 | 0 | 0 | 0 | 0  |
| 9. | TRAIN INTERVIEWERS  | 0 | 0 | 0 | 0 | 0 | 1 | 0 | 0 | 0 | 0  |
| 10.| FINISH              | 0 | 0 | 0 | 0 | 0 | 0 | 0 | 0 | 0 | 0  |

PREDECESSOR LIST

1. START
   2. PLAN SURVEY

2. PLAN SURVEY
   3. HIRE INTERVIEWERS
   4. DESIGN QUESTIONNAIRE

3. HIRE INTERVIEWERS
   7. TRAIN INTERVIEWERS

4. DESIGN QUESTIONNAIRE
   5. SELECT HOUSEHOLDS
   9. PRINT QUESTIONNAIRE
   8. TRAIN INTERVIEWERS

5. SELECT HOUSEHOLDS
   6. CONDUCT SURVEY

6. CONDUCT SURVEY
   7. ANALYZE RESULTS

7. ANALYZE RESULTS
   10. FINISH

8. TRAIN INTERVIEWERS
   6. CONDUCT SURVEY

9. PRINT QUESTIONNAIRE
   6. CONDUCT SURVEY

10. FINISH

FIG - 7

SYSTEM FOR GRAPHICALLY GENERATING THE SEQUENCE AND TEMPORAL RELATIONSHIP BETWEEN TASKS IN A PROJECT

FIELD OF THE INVENTION

This invention relates to computer-based systems for generating graphic charts and listings relating to the routing and temporal sequence of tasks involved in a project and more particularly to such a system which engages the user in an interactive dialogue to simplify the entry to the system of the basic information relating to the tasks and project.

BACKGROUND OF THE INVENTION

In connection with the planning and execution of a project involving a discrete number of tasks, some of which bear a required sequential relationship to one another and others of which are sequentially and temporally independent of one another, it is useful to prepare a project evaluation and review technique (PERT) chart graphically illustrating each of the tasks as a separate block with lines interconnecting the blocks to illustrate their relative sequence. These charts may be prepared manually for projects involving a relatively small number of tasks, but the effort required to generate such a chart increases exponentially with the number of tasks. Accordingly, computer programs have been developed which will generate the charts automatically given operator input as to the identity of the tasks, their duration, and their sequence relative to one another. Some of these programs will additionally generate related charts and alphanumeric listings useful in accomplishing the tasks such as a work breakdown structure or Gantt chart. Systems employing such programs are illustrated in U.S. Pat. Nos. 3,380,177, 3,735,109 and 5,101,340.

While these programs as a class, have enjoyed substantial commercial success, and are usually employed when planning a project of any substantial magnitude, they place a heavy burden on the user in generating the input information and in particular the sequential order of the tasks relative to one another.

SUMMARY OF THE INVENTION

The present invention relates to a computer system for generating graphic charts and textual listings relating to the temporal and sequential order of a plurality of tasks required in the performance of a project which substantially eases the input burden on the user. In particular, it obviates the need for the user to explicate the sequential relationships of the tasks to one another through use of a process in which the computer generates and outputs to the user a series of inquiries related to the sequential order of two or more of the tasks relative to one another. The system chooses tasks to be listed in each inquiry based on the operators responses to previous inquiries and a logical analysis of the consequences of each response with respect to the sequential order of the tasks. By way of simplistic example, if the user responds to two inquiries by indicating that task A must proceed task B and that task B must precede task C, the system deduces that task A must precede task C, as well as all other tasks which must follow either task B or task C. In this way the sequence of each task relative to all of the other tasks in the project can be determined through generation of a relatively small number of inquiries.

The system makes decisions as to the tasks to be included in a particular inquiry based on operator responses to previous inquiries and through use of a path matrix setting forth the required sequential order between any two tasks as the intersection of a row representing one of the tasks with a column representing the other task. The response to the first inquiry allows two points of the matrix to be filled in and each response to a subsequent inquiry, by logical analysis, allows a larger number of points to be filled in as the task progresses.

The completed path matrix specifies the existence or non-existence of a sequential relationship between any two activities independently of the existence of intervening activities. That is it does not specify the length of the path between a first task and a second task which the path matrix specifies as necessarily following the first task. This simplification allows the path matrix to be constructed using a relatively small number of sequence inquiries to the operator.

The system uses the completed path matrix to generate an adjacency matrix specifying the immediate sequential relationship between adjacent tasks. Thus, of three tasks, A, B and C must immediately following one another, the path matrix will indicate that task A must precede task B and task C and that task B must precede task C. The adjacency matrix processes the path matrix information to specify that B must immediately follow A and C must immediately follow B. This precludes C from immediately following A.

The adjacency matrix contains all of the information relating to the sequential order of the tasks which operators have been required to input in prior art systems. It uses this information to generate desired graphic outputs, such as a PERT chart or Gantt bar graph, or alphanumeric listings in the same way as conventional programs.

It is therefore seen that the computer system of the present invention substantially simplifies the task of the user in generating charts indicating the routing and time relationships between the tasks forming a process by producing an interactive dialog between the user and the machine to extract the information required to generate the output from the user and relieving the user of the task of thinking out the specifics of the project.

BRIEF DESCRIPTION OF THE DRAWINGS

Other objectives, advantages and applications of the present invention will be made apparent by the following detailed description of a preferred embodiment to the invention. The description makes reference to the accompanying drawings in which:

FIG. 3 is a representation of a completed path matrix as generated by the system for the sample project;

FIG. 4 is an adjacency matrix generated by the system from the path matrix of FIG. 3;

FIG. 7 is a predecessor list generated by the system of the present invention from the information contained in the adjacency matrix of FIG. 4, for the sample project.

DETAILED DESCRIPTION OF A PREFERRED EMBODIMENT

The system of the present invention preferably utilizes a general purpose computer equipped with an application program which causes the computer to perform the series of operations specified. Preferably, the computer constitutes a personal computer such as an IBM compatible computer employing a 486 microprocessor or the like and an MS-DOS operating system. The user input is a conventional keyboard and the output consists of a display monitor and a printer.

Figure 1:
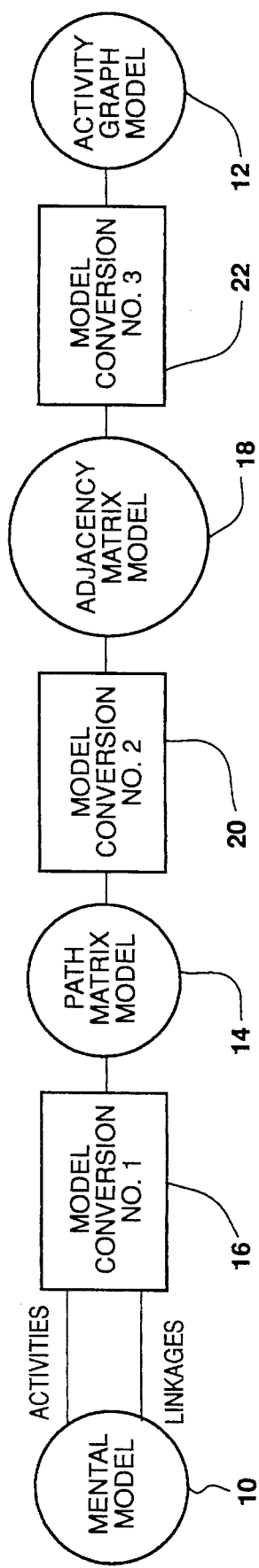
FIG. 1 is an overall block diagram of the method of operation of the system of preferred embodiment in converting an operator's mental model of the system into a graphic output.

FIG. 1 is a schematic diagram of the series of operations performed by the system to accept information from the operator, termed the mental model 10 and use it to generate a graphic or alphanumeric output 12 from the system, which would be displayed on the screen and could be outputted via the printer. The first step involves the generation of a path matrix model 14 setting forth the connectivity of each of the tasks required in the project; that is, the path matrix charts whether any particular task must precede or follow each of the other tasks in the project. The computer's operations in taking the operator information 10 and generating the path matrix model 14 are indicated as 16 and termed model conversion No. 1. Next, the system utilizes the path matrix model 14 and performs logical operations upon it, to generate an adjacency matrix model 18 specifying the immediate sequential order between the various tasks involved in the project. The computer operations required to convert the path matrix model 14 to the adjacency matrix model 18 are indicated at 20 and are termed model conversion No. 2. Next, the system utilizes the information contained in the adjacency matrix model to provide an output setting forth the tasks in their sequential and temporal relationships in a manner specified by the operator, at 12. This task is denominated 22 and constitutes model conversion No. 3.

Figure 2:
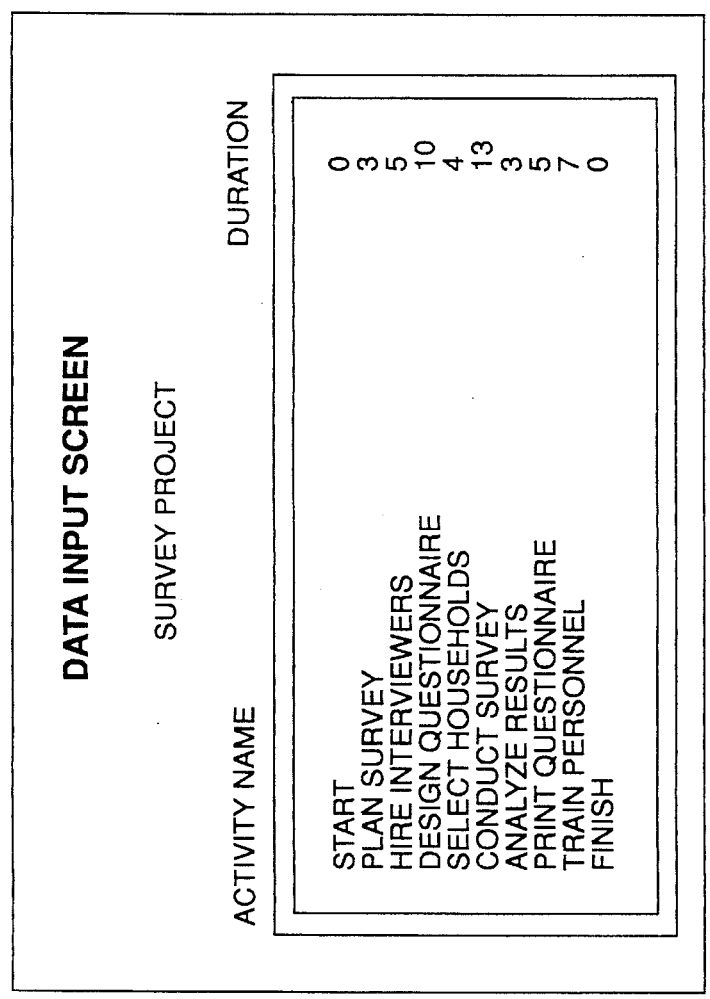
FIG. 2 is an illustration of a typical data input screen containing information inputted by an operator relating to a typical project.

To illustrate the operation of the system, consider a simple but otherwise typical project constituting the conduct of a survey of a number of households. The operator must necessarily define all of the individual tasks required in performance of the project and their duration. FIG. 2 illustrates a screen setting forth this task and duration list. The operator would enter the information to the system using the keyboard, prompted by appropriate screen messages. The tasks need not be inputted to the computer in any particular order, although it is usually easiest for an operator to specify the tasks in their general order of sequence. The task list will be preceded by the task "Start" and conclude with the task "Finish." The first task involves "plan survey" and the operator has denominated that the duration of this task will be three units of time, typically three days. The other tasks, and their duration are set forth in FIG. 2.

The computer must then generate a path matrix, in the form illustrated in FIG. 3. This corresponds to the matrix model 14 in FIG. 1 and the operation of creating that matrix from the input information is designated as Model Conversion No. 1, Item 16 on FIG. 1. The path matrix involves a number of rows, each associated with one of the tasks of the project, and an equal number of columns, each also associated with a particular task. Although the symbology is arbitrary, the matrix is preferably initially loaded with numerals "9" at each point of the matrix, representing the intersection of a row and column. The completed path matrix designates whether a task associated with a particular row, must precede the tasks on intersecting columns. If the task of a row does precede the task of a column, the system enters a 1 at that point of the matrix. If the task of the row does not necessarily precede the task of the intersecting column, a 0 is entered at that point of the matrix. For example, the operation "start" must precede all subsequent operations and accordingly the computer enters 1's at each point in Row 1, with the exception of point 1,1, since the start operation need not precede itself. Similarly, 0's are entered at each point in Row 10 since the finish operation does not precede any of the other tasks on the project.

The system then generates a series of inquiries to the operator, via the monitor, each inquiring as to the sequential order of two tasks. FIG. 4 illustrates a typical inquiry screen. The system inquires as to whether one of the activities, "conduct survey" must precede, must follow, or is independent of the second task. If the first task must precede the second task, the operator enters a 1, if a first task follow the second listed task, the operator enters a 2, if the two tasks have no necessary relationship, the operator enters a 3. Based on the operator responses, at least two intersections of the F matrix of FIG. 3 will be filled in. Since Item 2 "plan survey" must precede "select households," the system will enter a 1 at point 2,5 and a 0 at point 5,2. The system will then select two more tasks, which do not have 1's or 0's entered at their intersection.

After the response to the second inquiry is received by the system, more than two points may be filled in. If, for example, the second inquiry to the operator compares task 7 "analyze results," with task 6, "conduct survey," the system, in addition to filling in a 1 at point 6,7 and a 0 at point 7,6 can fill in a 0 at point 7,2 since, from the answer to the first inquiry the system learned that task 2, "plan survey" preceded task 6, "conduct survey" and since "conduct survey" precedes task 7, "analyze results" then "plan survey" must precede "analyze results."

The logical calculations performed by the computer system fall into the following categories:

1. There must be paths from any successor of the reference activity to all successors of the reference;

2. There cannot be paths from any successor of the reference activity can precede any predecessor of the reference implications;

3. There cannot be paths from any successor of the reference to it;

4. There cannot be paths from the reference element to any of its predecessors;

5. There cannot be paths from the successors of the reference element to any of those simultaneous with it;

6. There cannot be paths from those elements simultaneous with the reference element to its predecessors;

7. No activity can precede itself.

Thus, by applying logical constraints to the path matrix, a large number of points may be filled in with relatively few comparisons.

Considering the operation of model conversion No. 1 in detail, the program first initializes the path matrix by filling in all points with the numeral "9" or some other numeral other than a 0 or 1. Then, the system::

A. fills in the first row with a 0 at point 111 and 1's in all other positions since Start precedes all other tasks;

B. fills in the first column with 0's since no tasks precedes Start;

C. fills in the last column with 1's since each task precedes the finish;

D. fills in the last row with 0's since Finish does not precede any tasks; and

F. fills in the diagonal between point 1,1 and point 10,10 with 0's since no task precedes itself.

G. frames a first inquiry by selecting any two tasks and begins to generate inquires to the operator and fill in the chart based on their answers. It also performs logical analysis to fill in other points cells in the matrix beside the two directly associated with the query. The system choose additional queries based on the presence of the two points on the matrix, representing the sequential order of those two operations. The process continues until all of the "9" on the matrix have been converted to 0's or 1's.

The system then uses the information in the path matrix of FIG. 3 to create the adjacency matrix of FIG. 4. The adjacency matrix, like the path matrix, has a row and a column for each task and the intersection of a row with a column is converted to a 1 if the activity in the row precedes the activity in the column and there is no other activity between these two; i.e., any activity that follows the activity in the row and precedes the activity in the column.

Thus, a 1 is entered at row 1, column 2 since the activity "start" of row 1 precedes the activity "plan survey" of column 2 and there is no intervening activity; that is, "start" and "plan survey" are immediately adjacent. No other 1's are entered in row 1 since "plan survey" precedes all subsequent activities and thus they are not adjacent to "start."

The program algorithm for calculating adjacencies to construct the matrix of FIG. 4 consist of searching the path matrix of FIG. 3 for 1's. When a 1 is found, say at row i and column j, the program forms two lists: one that consists of the column numbers of the other 1's in row i and the second that consists of the row numbers of the other 1's in column j. If there is any overlap between these two sets the columns i and j are not adjacent; otherwise they are adjacent ad a 1 is inserted into the i-jth cell of the adjacency matrix of FIG. 4. This routine is continued until all 1's in the path matrix have been analyzed.

The information in the adjacency matrix of FIG. 4 contains all of the information required to generate any of the conventional graphic displays or alphanumeric listings created by the programs of the prior art.

Figure 5:
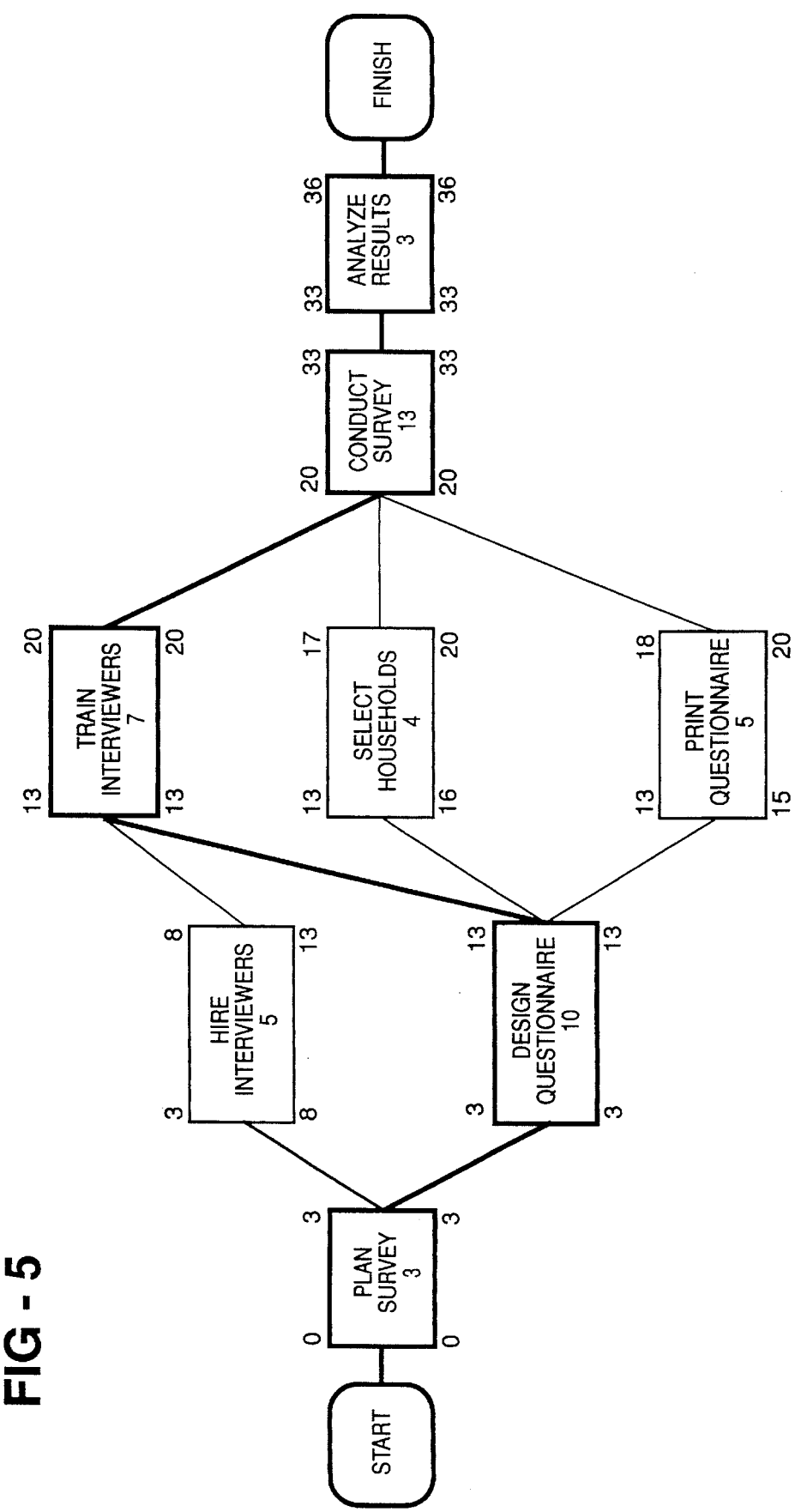
FIG. 5 is a PERT chart generated by the system from the adjacency matrix of FIG. 4, for the sample project.

FIG. 5 constitutes a PERT chart derived from the information in the adjacency matrix using commercially available software routines. Each activity in its interconnection to the other activities is laid out. Each box also contains the time required to perform the task. The upper left-hand corner of each box contains a numeral indicating the earliest time that activity can start. The upper right-hand corner contains the completion time based on that start date. The lower left-hand corner contains a numeral indicating the time that the activity must begin to avoid delaying the project as a whole in the lower right-hand corner numeral indicates when the activity will be completed based on that last possible start up date. The critical path through the project is indicated with heavy lines. Therefore, the activities on the critical paths have the same start times in their left-hand inputs. Those boxes not on the critical path, such as "select households" will have different earliest and latest input dates. Thus, select households can begin in the 13th day of the project as soon as "design questionnaire" is completed but may start as late as the 16th date without delaying the entire project.

Figure 6:
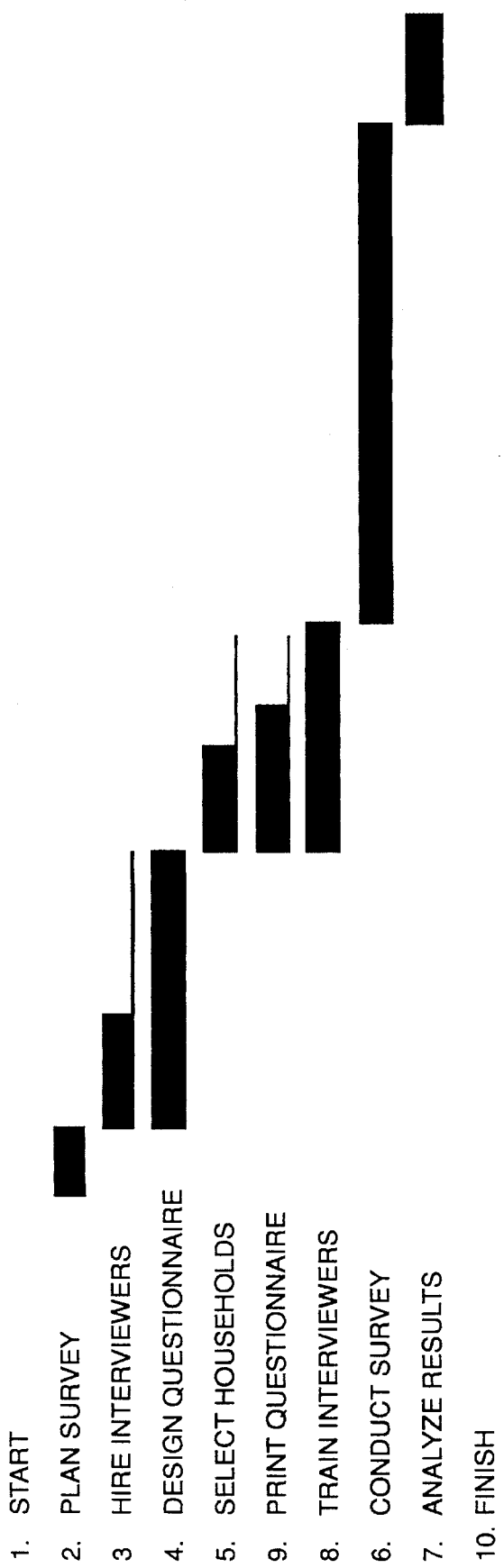
FIG. 6 is a bar chart generated by the system of the present invention utilizing the information in the adjacency matrix of FIG. 4, for the sample project.

FIG. 6 is a bar chart or gast chart setting forth the time duration for each activity as a heavy line and the slack in each activity is a lighter extending line.

Finally, FIG. 7 is a predecessor list which is useful in forming the survey since it allows quick location of the activities that must be completed before any activities start.

Having thus disclosed our invention we claim:

1. In a system for graphically indicating routing and time relationships between tasks forming a process, the improvement comprising:

means for a user to input to the system a list of tasks;

means for generating a plurality of inquiries to the user, each inquiry relating to a sequential relationship between two of the tasks;

means for a user to input to the system responses to said inquiries;

means utilizing the user's responses to certain of the inquiries to generate additional inquiries; and means, utilizing the list of tasks, and said user's responses to said inquiries, to create an activity graph displaying routing and time relationships between the tasks.

2. The system of claim 1 wherein said means for generating a series of inquiries to the user each relating to the sequential relationship of two of the tasks employs a matrix comprising rows associated with each task and columns associated with each task with the intersection of a given row and column indicating precedence order between the tasks associated with that row and that column.

3. The system of claim 2 including means for analyzing the user's response to any inquiry and its logical implications to ascertain more than two points on the matrix.

4. The system of claim 1 wherein the system utilizes said first matrix to create a second matrix wherein each row is associated with one of the tasks and each column is associated with one of the tasks and intersections of columns and rows in the matrix indicate the immediate sequential relationship, if any, between the tasks associated with that particular row and that particular column.

* * * * *